United States

Matsumura et a

[11] 3,877,783
[45] Apr. 15, 1975

[54] GRADIENT REFRACTIVE INDEX LIGHT-CONDUCTING GLASS STRUCTURE

[75] Inventors: Hiroyoshi Matsumura, Osaka-shi; Seiichi Ono, Itami-shi, both of Japan

[73] Assignee: Nippon Selfoc Kabushiki Kaisha, Tokyo-to, Japan

[22] Filed: Sept. 26, 1969

[21] Appl. No.: 861,247

[30] Foreign Application Priority Data
Sept. 28, 1968 Japan.............................. 43-70467

[52] U.S. Cl.............. 350/96 R; 350/175 GN; 65/30
[51] Int. Cl. ............................................. G02b 5/14
[58] Field of Search ............ 350/96, 96 B, 175 GN; 65/30

[56] References Cited
UNITED STATES PATENTS

| | | | |
|---|---|---|---|
| 2,511,517 | 6/1950 | Spiegel..................... | 350/175 GN X |
| 3,320,114 | 5/1967 | Schulz............................. | 350/96 X |
| 3,434,774 | 3/1969 | Miller ................................. | 350/96 |
| 3,486,808 | 12/1969 | Hamblen.................. | 350/175 GN X |

OTHER PUBLICATIONS

Miller, Article in *Bell System Technical Journal*, Vol. 44, No. 9, Nov. 1965, pp. 2017–2030.
Kawakami et al., Article in *Proceedings of the IEEE*, Dec. 1965, pp. 2148 & 2149.

*Primary Examiner*—David H. Rubin
*Attorney, Agent, or Firm*—Robert E. Burns; Emmanuel J. Lobato; Bruce L. Adams

[57] ABSTRACT

A light-conducting glass structure, the refractive index of which in each cross section perpendicular to the centre line or plane along which light is to advance of the structure decreases progressively from the centre line or plane toward the outer surface of the structure, and the rate of decreasing the refractive index is smaller at the vicinity of at least either end surface being transverse to the centre line or plane than that in the other part of the glass structure. The decrease of refractive index occurs by varying the concentration within the glass structure of at least two kinds of cations (They differ from each other in their contributions to increasing of refractive index.) constituting modifying oxides. The rate of decreasing refractive index at the vicinity of at least either end surface of the glass structure is made to carry out by such a manner that the cation within the glass structure (Which is either of at least two kinds of cations mentioned above and has higher contributions to the increase of refractive index than that of the other.) is substituted by another cation from an external cation source in a greater extent, or a stretching ratio of a part to be an end surface of the glass structure having a certain rate of decreasing refractive index is adjusted to be smaller.

3 Claims, 15 Drawing Figures

GRADIENT REFRACTIVE INDEX LIGHT-CONDUCTING GLASS STRUCTURE

BACKGROUND OF THE INVENTION

This invention relates to light-conducting glass structures and more particularly to new light-conducting glass structures each having a focusing effect and a refractive index progressively decreasing from the centre region toward the surface of the glass structure. The invention further concerns a method for producing these light-conducting glass structures.

As a fibrous glass structure having focusing effect for light-conduction, a light-conducting glass structure having a refractive index which is caused to decrease progressively from the centre line toward the outer surface has been already proposed in an earlier U.S. Patent application Ser. No. 806,368, filed Mar. 12, 1969 and now abandoned, which earlier application has been assigned to the same assignee as the instant application.

In this light-conducting glass structure, there are almost no differences in light ray paths, that is, staggering or lagging in phase velocities among individual rays of a light beam, and the glass structure is advantageous in that conduction of picture images can be carried out by only a single structure.

When an incident light beam is introduced into a light-conducting glass structure as mentioned above, it is desirable to introduce the light beam with an inherently optimum spot size for the refractive index distribution of a certain light-conducting glass structure, if the wave length of the incident light beam to be introduced is constant. However, since most light-conducting glass structures have radiuses less than 1 mm., particularly 0.05 – 0.3 mm. in many cases, difficulties are encountered in most cases in accurately introducing an incident light beam into a glass structure with optimum spot size as mentioned above. The optimum spot size should preferably have a radius in the range of approximately one-third to approximately one-twentieth of that of the structure in order that light beam can advance in the structure when the structure is bent.

SUMMARY OF THE INVENTION

The present invention contemplates overcoming the above-mentioned difficulties in introducing incident light beam into a glass structure, providing a light-conducting glass structure by which mode matching can be easily carried out, and providing a method for producing the same, the subject matters thereof being as follows.

1. A light-conducting glass structure in which the relative concentration of at least two kinds of cations constituting modifying oxides within the glass is caused to vary, and the refractive index in each cross section decreases progressively from its centre line or plane toward the outer surface of the glass structure, the rate of this decrease being less in the vicinity of at least either end surface transverse to the centre line or plane than that in the other parts of the glass structure.

2. A method for producing the light-conducting glass structure having focusing effect as described in the above paragraph, characterised by the step of causing a glass structure containing at least one cation constituting a modifying oxides to contact an ionic source containing at least one other cation capable of constituting a modifying oxide having a smaller value of (electronic polarisability) / (ion radius)$^3$ within the glass structure than that in the case of the former cation in such a manner that the cation in the glass structure is substituted by the cation in the source to a greater extent at the vicinity of at least either one surface transverse to the centre line or centre plane than in other parts of the glass structure.

3. A method for producing the light-conducting glass structure having focusing effect as described in the above paragraph 1 and characterised by the steps of causing a glass structure containing first cation constituting a modifying oxide to contact with an ionic source containing another cation constituting a modifying oxide having a smaller value of (electronic polarisability) / (ion radius)$^3$ within the glass structure to substitute the first cation within the glass structure, from its contact surface toward the central part thereof, by the cation in the source, and then subjecting the glass structure to heat stretching in the centre line or centre plane direction of the structure so that the rate of the stretching at the vicinity of at least either end surface transverse to the centre line or centre plane is less than that in other parts of the glass structure.

BRIEF DESCRIPTION OF THE DRAWING

In the drawings:

FIGS. 9 through 12, inclusive, relate to a specific example of the invention in which FIG. 9 is a schematic elevation, in vertical section, showing a device for producing the glass structure of the invention, FIG. 10 is a graphical representation indicating the variation of the measured value of radius in each vertical section with respect to the centre line of the glass structure, FIG. 11 is a graphical representation indicating the drawing out speed of the glass structure from a salt bath, and FIG. 12 is a graphical representation indicating the refractive index distribution of the glass structure obtained in a specific example of the invention;

FIGS. 13 and 14 relate to another specific example of the invention in which FIG. 13 is a schematic elevation, in vertical section, showing a device for stretching a glass structure, and FIG. 14 is a graphical representation indicating the variation of the measured value of radius in each vertical section with respect to the centre line of the glass structure.

DETAILED DESCRIPTION

Figure 1:
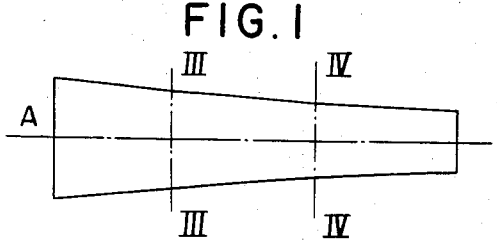
FIG. 1 is a graphical representation indicating one example of the variation of the outer diameter of a light-conducting glass structure according to the invention.

In the light-conducting glass structure having focusing effect of the present invention, a refractive index n in a cross section perpendicular to the centre line of the glass structure and at the distance z of the cross section from one end of the glass structure in the direction of the centre line can be represented as an approximation by the following equation.

$$n = n_o [ 1 - a(z) r^2 ]$$

where:
  $r$ is the distance from the centre line of the glass structure in a radial direction; and
  $n_o$ is the refractive index of the glass at the centre line part of the structure.

In this case, refractive index $n$ decrease progressively from the centre line toward the surface of the glass structure, and the most important point of the light-conducting glass structure of the present invention resides in the feature that the value $a(z)$ varies in accordance with the variation of the distance z in the vicinity of at least either end of the glass structure, and the value $a(z)$ in the vicinity of this end is less than that in the middle part of the both axial ends of the structure. That is, a decreasing rate of the refractive index, in a cross section perpendicular to the centre line of the structure in the vicinity of the end thereof, from the centre line part toward the surface of the glass structure is smaller than that in the middle part between the axial ends of the structure.

Considering the end of the glass structure, that is, the case where the distance z is zero, it is desirable that the value $a(z)$ increase progressively in accordance with increase in the distance z in at least a part near the end where the distance $z = 0$, and the value $a(z)$ is adjusted so as to reach a certain value in the middle part between the axial ends of the glass structure.

It has been found that the rate of increase of the value $a(z)$ in accordance with increase in the distance z in a part near the end of the structure which is approximately representable by, for example, the following equation is suitable.

$$a(z) = k(1 + \alpha z)^2$$

where:
  $k$ and $\alpha$ are positive constants, respectively; and
  $\alpha$ is a sufficiently small value in comparison with that of $k$.

It is to be noted that the aforesaid refractive index $n_o$ is not necessarily required to be always constant in all centre line parts of the glass structure but may be gradually varied in accordance with the variation of the distance z.

The light-conducting glass structure having focusing effect can be easily produced in such a manner that, for example, the shape thereof is tapered with an easy gradient in the vicinity of at least either end thereof. That is, the shape of the glass structure is such that the surface of the end thereof has a larger radius than the middle part between the two axial ends of the structure, and the radius thereof decreases gradually from the end surface toward the middle part.

Considering the shape of the aforesaid taper at a part near to the end of the glass structure where $z = 0$, it has been found that desirable results can be obtained by a shape which is nearly representable by, for example, the following equation.

$$d = d_o (1 + \alpha z)^{-1}$$

where:
  $d$ is the radius in the plane at the distance z from one end toward the other end of the glass structure in the direction of the centre line thereof; and
  $d_o$ is the radius in the surface of the end where $z = 0$.

However, the shape of the light-conducting glass structure according to the present invention is not necessarily limited to that mentioned above, but, for example, a rod-shaped glass structure having substantially constant diameter can be produced.

In order to indicate still more fully the nature of the refractive index distribution and shapes of the light-conducting glass structures having focusing effect of the present invention, one example thereof will be described hereinbelow in connection with the accompanying drawings.

FIG. 1 is a graphical representation indicating the variation of the diameter of a light-conducting glass structure according to this invention in which the diameter is maximum in the end surface A of the structure and decreases progressively toward the other end surface thereof.

Figure 2:
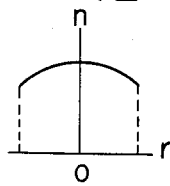
FIGS. 2 through 4, inclusive, are graphical representations indicating the refractive index distributions in the end surface A, in the section taken along the line III — III, and in the section taken along the line IV— IV of FIG. 1, respectively.
Figure 3:
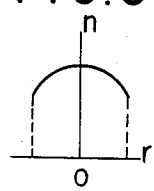
Figure 4:
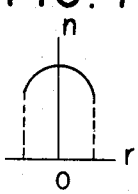

The rate of decrease of the refractive index, from the centre line toward the surface of the glass structure in the end surface A is as indicated in FIG. 2, and this rate is less than those in the other sections of the structure. (The refractive index distribution in the section taken along the line III — III of FIG. 1 and that in the section taken along the line IV — IV of FIG. 1 are indicated in FIGS. 3 and 4 respectively.)

Figure 5:
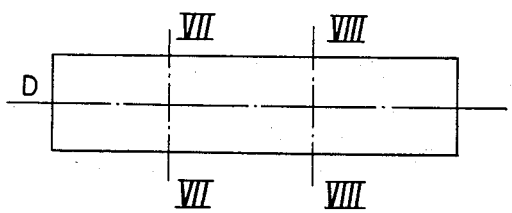
FIG. 5 is a graphical representation indicating another example of the variation of the outer diameter of a light-conducting glass structure of the invention.
Figure 6:
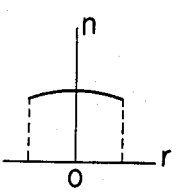
FIGS. 6 through 8, inclusive, are graphical representations indicating the refractive index distributions in the end surface D, in the section taken along the line VII — VII, and in the section taken along the line VIII — VIII of FIG. 5, respectively.
Figure 7:
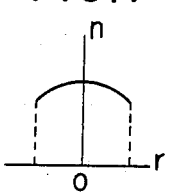
Figure 8:
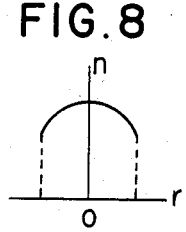

The shape of the light-conducting glass structure according to this invention is not limited to that indicated in FIG. 1, but a rod-shaped glass structure having substantially constant diameter, for example, as indicated in FIG. 5 may be used. In this case, it is desirable to vary progressively the refractive index distribution as indicated in FIGS. 6 through 8, respectively. (The refractive index distribution in the end surface of the structure illustrated in FIG. 5, that in the section taken along the line VII — VII of FIG. 5, and that in the section VIII — VIII of FIG. 5 are indicated in FIGS. 6, 7, and 8, respectively.)

The process of the production of the light-conducting glass structure having focusing effect according to the present invention will be described below.

A glass structure in molten state is upwardly drawn out from its free surface in a fibrous or rod shape and is then subjected to cooling to solidify. In this case, the diameter of the structure can be readily changed by changing the drawing out speed, cooling speed, and temperature of the molten glass structure. For example, an increase in the diameter of the glass structure can be attained by any one of the steps of decreasing the drawing out speed, increasing the cooling speed, and lowering the temperature of the molten glass structure, that is, a glass structure having a suitable shape can be obtained by adjusting the above-mentioned conditions.

Furthermore, the glass structure having a suitable shape as mentioned above can be also obtained in a manner such that a glass rod having a substantially constant diameter which has been previously produced is successively introduced into a heating furnace from its one end while being pulled by a constant external force to stretch it. When the rod so stretched reaches a suitable shape, it is taken out from the heating furnace.

In the case when a glass structure having a comparatively short length is required, a glass rod may be ground until its suitable shape is obtained.

Next, a method for establishing the refractive index distribution as mentioned above in the glass structure having a suitable shape obtained by the above-mentioned processes will be described hereinbelow.

In general, the refractive index of a substance has a relationship to the molecular refraction and molecular volume characteristic of that substance and increases with increase in the molecular refraction and with decrease in the molecular volume.

The molecular refraction is proportional to the polarisability of that substance. It is considered that the molecular refraction of a glass can be represented as an approximation by the sum of the individual ion refractions. Accordingly, the quantitative effect of the presence of certain ions on the refractive index of a glass can be determined from a comparison of the values of electronic polarisation per unit volume or the values of (electronic polarisability) / (ion radius)$^3$ of the ions concerned.

In general, cations of larger ratios of electronic polarisability to (ion radius)$^3$ within a glass have a tendency to contribute more greatly to increase in refractive index. That is, this tendency in the case of monovalent cations is of the sequence: Tl >Li >K ≈ Na ≈ Rb. In the case of divalent cations, the relationship thereof in the order of degree of contribution toward increase in the glass refractive index is: Pb >Ba >Cd >Sr >Ca Zn >Be >Mg.

That is, a glass structure containing oxides of metals having comparatively larger (electronic polarisability)/(ion radius)$^3$ of ion such as Tl within the glass (the aforesaid metal is referred to hereinafter simply as "A") is immersed into a bath of molten salts such as nitrates and sulfates of metals such as Li, Na, K and the like, the ions of which have comparatively small values of (electronic polarisability) / (ion radius)$^3$, respectively, (each of the latter metals is hereinafter referred to simply as "B") to substitute A ions in the glass structure by B ions through its surface, whereby the refractive index distribution can be varied. The ion exchange as mentioned above varies in accordance with the variations of the temperature of the molten salt bath and the period of immersion of the structure in the molten salt bath, and, accordingly, by adjusting these factors, a light-conducting glass structure having a suitable refractive index distribution can be obtained. Furthermore, in the above case, the quantity and speed of the substitution of both A and B ions can also be adjusted by employing not a single kind of B ion, but a mixed salt containing a lower concentration of A ions than that in the glass as the molten salt mentioned above.

Moreover, the light-conducting glass structure having focusing effect according to the present invention can be produced also in a manner such that a glass rod having a substantially constant diameter is subjected to ion exchange by the above-mentioned process, then, the ion-exchanged glass rod is placed in a heating furnace to elevate its heating temperature to that at which the rod can be deformed and is stretched so as to form a specific shape. In this case, a glass structure having a suitable shape may be also obtained in such a manner that a glass rod is successively introduced into a heating furnace from its one end while being pulled by a constant external force to stretch it, and when the stretched rod assumes a suitable shape, it is taken out from the heating furnace. It is desirable to grind the ends of the resulting light-conducting glass structure, and in the case where the glass structure is cut in accordance with necessity, it is also desirable to grind the ends so cut of the glass structures.

When an incident light beam is introduced into the glass structure having focusing effect according to this invention through an end surface (the end where $z = 0$ being considered) at which the rate of decreasing refractive index from the centre line part toward the surface of the structure is less than that of parts other than that of the end surface, the optimum spot size in the end surface represented by the following equation is comparatively large.

$$w_o = \sqrt{\frac{\lambda}{n_o \pi}} \cdot 2^{-3/4} \cdot a(0)^{-1/4}$$

where:
$\lambda$ is the wave length of the incident light; and
$a(0)$ is the value of $a(z)$ at $z = 0$.

Accordingly, by the adoption of the light-conducting glass structure of this invention, light beam can be made to undergo mode matching thereby to accurately introduce incident light beams.

As mentioned above, the spot size of the incident light beam so introduced gradually decreases while it is maintained at a value equivalent to the optimum size in each cross section perpendicular to the centre line of a glass structure, and the spot size reaches a certain value where the value $a(z)$ does not vary in the $z$ direction.

Since the light-conducting glass structure of the present invention has a high resolving power in time and space, an excellent picture image or laser pulse can be conducted by the adoption thereof.

Furthermore, in a light-conducting glass structure having focusing effect since the axial length thereof has a limitation relating to the problem of its production, there arises a necessity of joining two light-conducting glass structures, and in this case, when light-conducting glass structures of this invention are employed, their optical axis alignment and mode matching become easy because the optimum spot size of the aforesaid end surface of the glass structure in which an incident light beam is introduced is large, and the area of the end surface is comparatively large.

It is possible to join light-conducting glass structures according to the present invention with each other, and a glass structure of this invention can be joined also with a conventional light conducting glass structure having focusing effect but having a refractive index distribution not varying in its axial direction.

In either of the above cases, when two glass structures having focusing effect and identical refractive index distributions in their end surfaces are joined, these structures are merely bonded to each other. In the case when two glass structures having different refractive index distributions in their end surfaces are joined, they may be joined through a suitable lens system. Moreover, in the latter case, that is, when two light-conducting glass structures having focusing effect and different refractive index distributions in each end surface thereof are joined, it is also possible to join them by bonding each end surface thereof to the other through another light-conducting glass structure of the present invention in which refractive index distribution in one end surface is equal to that of either of the first two glass structures, and the refractive index distribution in the other end surface is equal to that of the remaining other glass structure.

In the case where an end surface of the glass structure of the present invention at which the rate of decreasing refractive index from its centre line part toward its surface of the glass structure is less than that of other parts in adopted as a light exit surface, since the width of the light beam introduced from the other end surface of the glass structure gradually spreads at the light exit surface of the structure while repeating focusing of light beams, particularly, in the case of conducting a picture image, a magnified image can be easily obtained, and the glass structure of this invention can be utilized for observations of minute concave parts. In this case, it is possible, of course, to obtain a reduced image when the aforesaid light exit surface of the glass structure is used for an incident light surface.

In order to indicate still more fully the nature and utility of the invention, the following specific examples of practice constituting preferred embodiments of the invention are set forth, it being understood that these examples are presented as illustrative only and that they are not intended to limit the scope of the invention.

The light-conducting glass structure stated above in which the refractive index in a given cross section varies progressively with increasing distance away from the center point in the cross section is one embodiment of the present invention. The invention also includes as another embodiment thereof such structure as is disclosed and claimed in said copending application Ser. No. 806,368, filed Mar. 12, 1969, and now abandoned; that is, a structure having such a refractive index distribution in a cross section perpendicular to a center plane thereof as to satisfy substantially the equation;

$$n = n_o (1 - ar^2)$$

wherein
$n_o$ represents the refractive index at a line which is the line of intersection of the center plane and the plane of the cross section,
$n$ represents the refractive index at a normal point at a distance $r$ from said intersection line, and
$a$ is a constant,
whereby light introduced into one end face transverse to said center plane is conducted therethrough to be directed out of other end face opposite said one end face.

Such a non-cylindrical or a non-concentric structure is equivalent in function to a usual cylindrical lens or a combination of the cylindrical lenses. The structure can be in any structural form such as a plate, a film, a ribbon, a tube, as well as a rod or bar, and a fiber.

Example 1.

Figure 9:
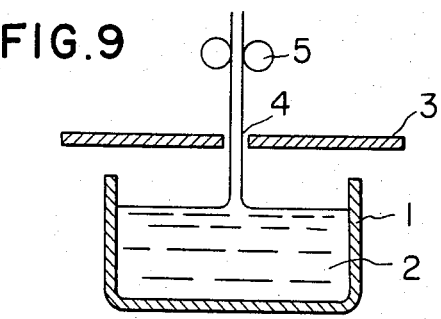

Referring to FIG. 9, a glass composed of 56 percent of $SiO_2$, 14 percent of $Na_2O$, 20 percent of $Tl_2O$, and 10 percent of PbO (All the percentages of quantity are by weight.) was melted in a platinum crucible 1, and the molten glass 2 was maintained at a constant temperature within a range of from 950–1100°C. A small hole 4 was provided on an insulating member 3 placed over the platinum crucible 1. Molten glass was drawn out and up through the small hole 4 and introduced into the space between rollers 5 each of a diameters of 150 mm. rotating at approximately 20 r.p.m., the glass being pulled up thereby at a constant speed into a glass fibre.

After a certain lapse of time, the rotational speed of the rollers was gradually decreased, and adjusted to 1 – 5 r.p.m. when the length of the glass fibre pulled up after decreasing of the rotational speed became approximately 1 metre.

Figure 10:
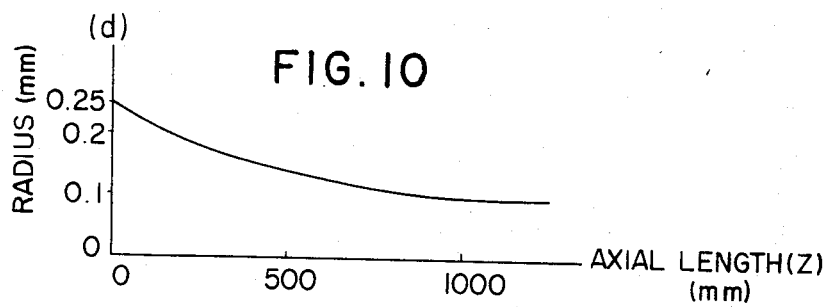

The measured values of the radius of the resulting glass fibre were as indicated in FIG. 10.

For removing stress in the glass fibre caused by rapid cooling, the glass fibre was maintained in a heat moderating furnace at a temperature of approximately 460°C for 5 hours thereby to carry out slow cooling. The refractive index of the glass fibre thus obtained was 1.562, and the distribution thereof was substantially uniform.

Next, the glass fibre was immersed in a molten salt bath in order to establish a suitable refractive index distribution in this glass fibre. The salt admixture was composed of potassium nitrate, as the principal constituent, and approximately 0.5 percent by weight of thallium nitrate which was added so as not to cause a excessive difference in the refractive indexes in the centre line and surface parts of the glass fibre and to moderate the variation of refractive index distribution.

When the glass fibre mentioned above was immersed in the mixed salt both, the temperature of which was maintained at approximately 500°C, $Tl^+$ ion within the glass was gradually substituted by $K^+$ ion in the salt bath from the surface part toward the centre line part of the glass fibre. After 5 hours, $K^+$ ion entered into the vicinity of the centre line of a part of the glass fibre having a constant radius of approximately 0.1 mm., and, as a result, $Tl^+$ and $Na^+$ ions which were positioned in this part migrated toward the surface part of the glass fibre.

Figure 11:
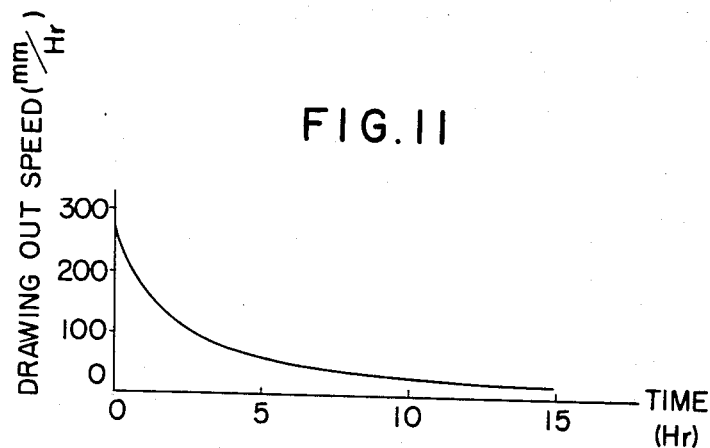

In this stage, the part of the glass fibre having a constant radius of approximately 0.1 mm. mentioned above was drawn out from the salt bath, and, successively, the glass fibre was drawn out from its part of small diameter toward that of large diameter at a speed as indicated in FIG. 11 by a graphical representation in such a manner that a certain part of the glass fibre was drawn out from the salt bath when $K^+$ ion reached its centre line part in its corresponding section. In this case, it is desirable to control the drawing speed of the glass fibre by a program control. After cooling, rinsing with water, and drying of the drawn out glass fibre, both ends thereof were ground to a flat surface.

It was found by the measurement of the refractive index distribution of the glass fibre thus obtained that the refractive index n in each cross section perpendicular to the centre line of the fibre except for its peripheral surface part was substantially in accordance with the following equation.

$$n = n_o [1 - a(z) r^2].$$

Figure 12:
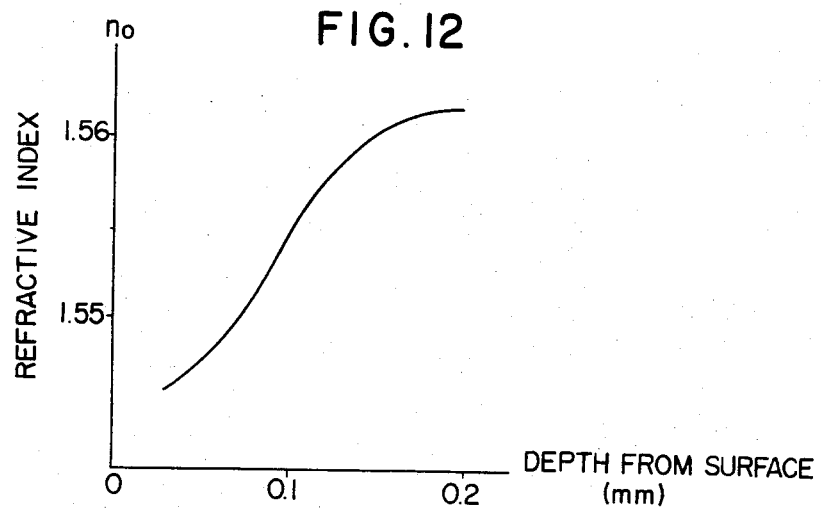

One example of a distribution of the refractive index in cross section of a part of the glass fibre having a 0.2 mm. radius is indicated in FIG. 12 by a graphical representation.

In the case where an incident light beam was introduced through one end of the glass fibre, there were almost no differences in its light path and staggering or differences in phase velocities of the light beam which reached the other end of the fibre, and, accordingly, this glass fibre can be employed for light communication. Furthermore, it is to be noted that image conduction can be achieved with a single glass fibre of this invention, and that when an end surface having a larger diameter was adopted as incident light side, since its optimum spot size was large (in this example, the optimum spot size in this end surface was approximately 1.6 times the optimum spot size in the other end surface), incident light beams could be accurately introduced.

Example 2.

A glass having the same composition as that specified in Example 1 was melted by the device illustrated in FIG. 9, and molten glass was drawn out at a constant speed while its temperature was maintained at from 900° to 950°C thereby to obtain a glass rod of approximately 0.5 mm. radius and approximately 1 metre length, and the glass rod was gradually cooled.

On the other hand, an admixed salt bath composed of potassium nitrate, as the principal constituent, and approximately 0.5 percent by weight of thallium nitrate was maintained at a temperature of approximately 500°C, the aforesaid glass rod was immersed into the bath for 24 hours, and then, the rod was cooled, rinsed with water, and dried, thereby to obtain a glass structure.

It was found by the measurement of refractive index distribution of the glass structure thus obtained that the refractive index $n_o$ in the centre line part thereof was 1.560, the refractive index of the surface part was 1.550, and the refractive index $n$ in each cross section perpendicular to the centre line of the structure except for its surface part was substantially in accordance with the following equation.

$$n = n_o (1 - ar^2)$$

where:

$a$ is a positive constant. FIG. the glass

Figure 13:
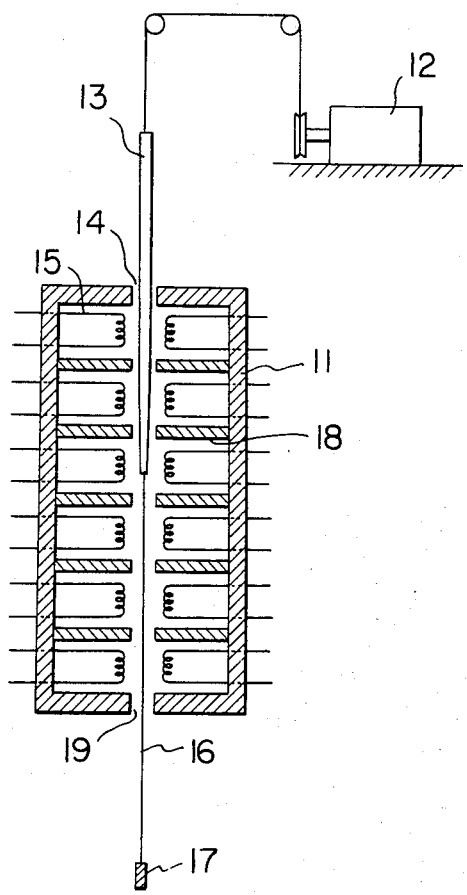

Next, the glass structure was fed through a heating furnace shown in FIG. 13 to stretch the same. As shown in FIG. 13, a feeding device 12 was placed over a heating furnace 11 having a height of approximately 1.5 metres. By this feeding device, the glass structure 13 was fed through an opening 14 at the upper end of the heating furnace at a constant speed. In the case of this example, the speed was controlled within a range of from 26 to 50 mm. per minute.

The glass structure 13 passing through the heating furnace 11 was heated by electric heating elements 15, and pulled down and stretched by a weight 17 of 0.5 − 3 gr. attached to the lower end of the glass structure 13 through a copper wire 16. Since a part of comparatively large diameter of the glass fibre was heated in the inner and upper part of the heating furnace 11, it was desirable to make the temperature in this part higher than the inner and lower part of the furnace 11. In this example, the upper and lower parts of the furnace were maintained at temperatures of approximately 700°C and 450°C respectively, and the temperature was made to gradually vary from the upper part toward lower part of the furnace, and insulating boards 18 were provided for maintaining the temperature distribution mentioned above.

The part of the glass structure 13 pulled out from an opening 19 of the lower end of the heating furnace had a substantially constant radius of 0.1 mm. The glass structure 13 thus stretched was taken out from the furnace at a stage wherein a part of the structure not yet inserted into the furnace 11 still remained above the furnace and introduced into a heat moderating furnace to gradually cool the same for 2 hours at a temperature of approximately 460°C, thereby to carry out removal of the stress of the glass structure.

Figure 14:
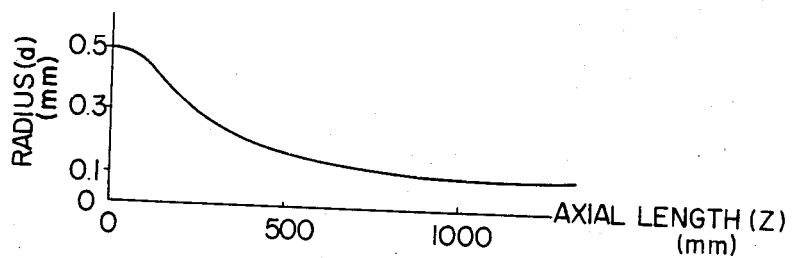

The radius of the glass structure thus obtained was as indicated in FIG. 14. Furthermore, it was found that the refractive index of the glass structure in each cross section perpendicular to the centre line of the structure except for its surface part was substantially in accordance with the following equation.

$$n = n_o [1 - a(z) r^2]$$

Moreover, the refractive index of the centre line part of the glass structure having a 0.2 mm radius was 1.560, and the refractive index in its surface part was 1.551, these values being substantially the same as those having a 0.5mm radius. Accordingly, it was found that the value $a(z)$ increased gradually from the end surface of a larger area toward the middle part between the axial ends of the glass structure. The two end surfaces of the resulting glass structure were ground for use.

The glass structure obtained in the present example has the same functions and merits as that obtained in the case of Example 1, and the introduction of an incident light beam into the end surface of a larger area was facilitated. Furthermore, when the aforesaid end surface was adopted as light exit surface, since the width of the incident light beam introduced from the other end surface of the glass structure spread gradually, a magnified image could be easily obtained. Accordingly, the glass structure of the present invention can be utilized for bore-scopes or celioscopes and the like.

Example 3.

A glass having the same composition as that specified in Example 1 was melted by the device illustrated in FIG. 9, and the resulting molten glass was drawn out at a constant speed while being maintained at a constant temperature ranging from 900° to 950°C thereby to obtain a glass rod of approximately 0.5 mm. radius and approximately 2 metre length, which glass rod was then gradually cooled.

On one hand, an admixed salt bath composed of potassium nitrate, as the principal constituent, and approximately 0.2 percent by weight of the thallium nitrate was maintained at a temperature of approximately 500°C. When the aforesaid glass rod was immersed in the bath for 70 hours, $K^+$ ions reached the centre line part of the rod. In this condition, the glass rod was pulled up gradually from one end thereof at a speed which was adjusted such that it gradually decreased. Finally, the glass rod was immersed at the vicinity of the other end thereof into the admixed salt bath for 350 hours. The glass structure thus obtained was rinsed and dried, and, thereafter, it was found by measurement of refractive index distribution thereof that the refractive indexes of its centre line part were 1.545 at the vicinity of the end surface immersed for a longer period and 1.560 at the vicinity of the other end surface, that is, the refractive indexes varied gradually from one end toward the other end, and, while, the refractive index in the surface part of the glass structure was a substantially constant value of 1.530. Furthermore, it was found that since K⁺ ions infiltrated up to the centre line part in the part immersed in the salt bath for a long period, the refractive index in the centre line part decreased in comparison with that of the other parts of the glass structure.

Figure 15:
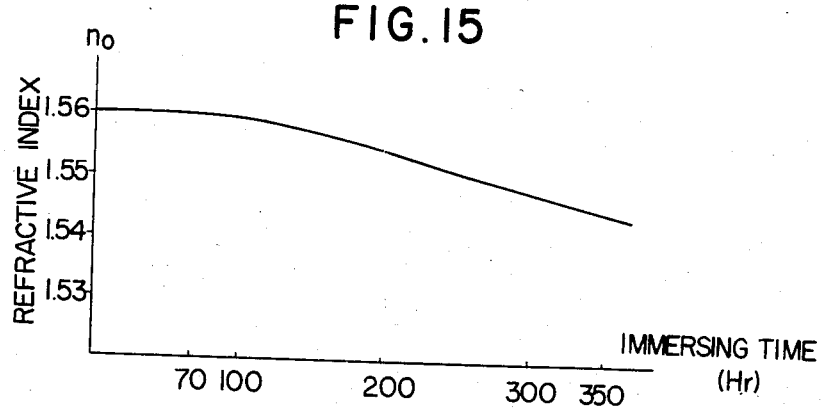
FIG. 15 relates to still another specific example of the invention and is a graphical representation indicating the variation of the refractive index in the centre line part of the glass structure obtained by the specific example in accordance with increase in the period of immersion of the structure in a salt bath.

The variation of the refractive index in the centre line part of the glass structure in accordance with its immersing time is indicated in FIG. 15.

Furthermore, it was found that the refractive index of the glass structure in each cross section perpendicular to the centre line of the structure except for its surface part was substantially in accordance with the following equation.

$$n = n_o(z) [1 - a(z) r^2]$$

where:

If the end surface immersed for a long period is considered to be side of $z = 0$, value $n_o(z)$ represents the refractive index in the centre line part of the glass structure, and this value slowly increases in accordance with increase in distance $z$.

The glass structure thus obtained had a substantially constant diameter, but since the rate of decreasing refractive index from the centre line part toward the surface part of the structure was lower in the vicinity of the end surface immersed in the salt bath for a longer period than that of the parts, the optimum spot size large in this end surface, and incident light beam could be accurately introduced. Accordingly, similarly as in the above described examples, when the aforesaid end surface was used as light exit surface, a magnified image could be easily obtained.

We claim:

1. A light-conducting glass structure having a predetermined refractive index and focusing effect comprising an elongated glass body having a center axis and having entrance and exit surfaces for light, both transverse to said center axis, and a side surface encompassing said center axis; said glass body having at least two kinds of cation means constituting glass-modifying oxides, wherein said at least two kinds of cation means are different in contribution to the refractive index of the glass and are ion-exchangeable with each other, and wherein the concentration within the glass of at least one of said cation means progressively decreases from said center axis toward said side surface and the concentration within the glass of at least one kind of remaining cation means progressively increases from said center axis toward said side surface; and said glass body having a refractive index gradient which is due to said concentration gradients, wherein said refractive index gradient produces said focusing effect, and is substantially expressed, at least in the vicinity of said center axis in each planar cross section perpendicular to said center axis, by the following equation:

$$n = n_o (1 - ar^2)$$

wherein $n_o$ represents the refractive index of the glass at said center axis, $n$ represents the refractive index at a distance $r$ from said center axis, and $a$ is a positive constant at the planar cross section, said positive constant being such that the value thereof increases from at least one surface of said entrance and exit surfaces for light toward the inside of the glass body along said center axis.

2. A light-conducting glass structure as claimed in claim 1 in which one kind of said cation means comprises ions of thallium and another kind of said cation means comprises ions of an alkali metal.

3. A light-conducting glass structure having a predetermined refractive index and focusing effect comprising an elongated glass body having entrance and exit surfaces for light both transverse to said center axis and a side surface encompassing said center axis; said glass body having at least two kinds of cation means constituting glass-modifying oxides, wherein said at least two kinds of cation means differ in their contribution to the refractive index of the glass and are ion-exchangeable with each other, and wherein the concentration within the glass of at least one kind of cation means progressively decreases from said center axis toward said side surface and the concentration within the glass of at least one kind of remaining cation means progressively increases from said center axis toward said side surface; and said glass body having a refractive index gradient which is due to said concentration gradients, wherein said refractive index gradient produces said focusing effect, and is substantially expressed, at least in the vicinity of said center axis in each planar cross section perpendicular to said center axis, by the following equation;

$$n = n_o (1 - ar^2)$$

wherein $n_o$ represents the refractive index of the glass at said center axis, $n$ represents the refractive index at a distance $r$ from said center axis, and $a$ is a positive constant at the planar cross section, said positive constant being such that the value thereof progressively increases from one surface toward the other surface of said entrance and exit surfaces for light, and wherein the diameter of said planar cross section perpendicular to said center axis decreases from said one surface toward said other surface of said entrance and exit surfaces for light.

* * * * *